Jan. 6, 1931.    G. W. TAYLOR    1,787,603
ROLLER BEARING
Filed Feb. 16, 1928
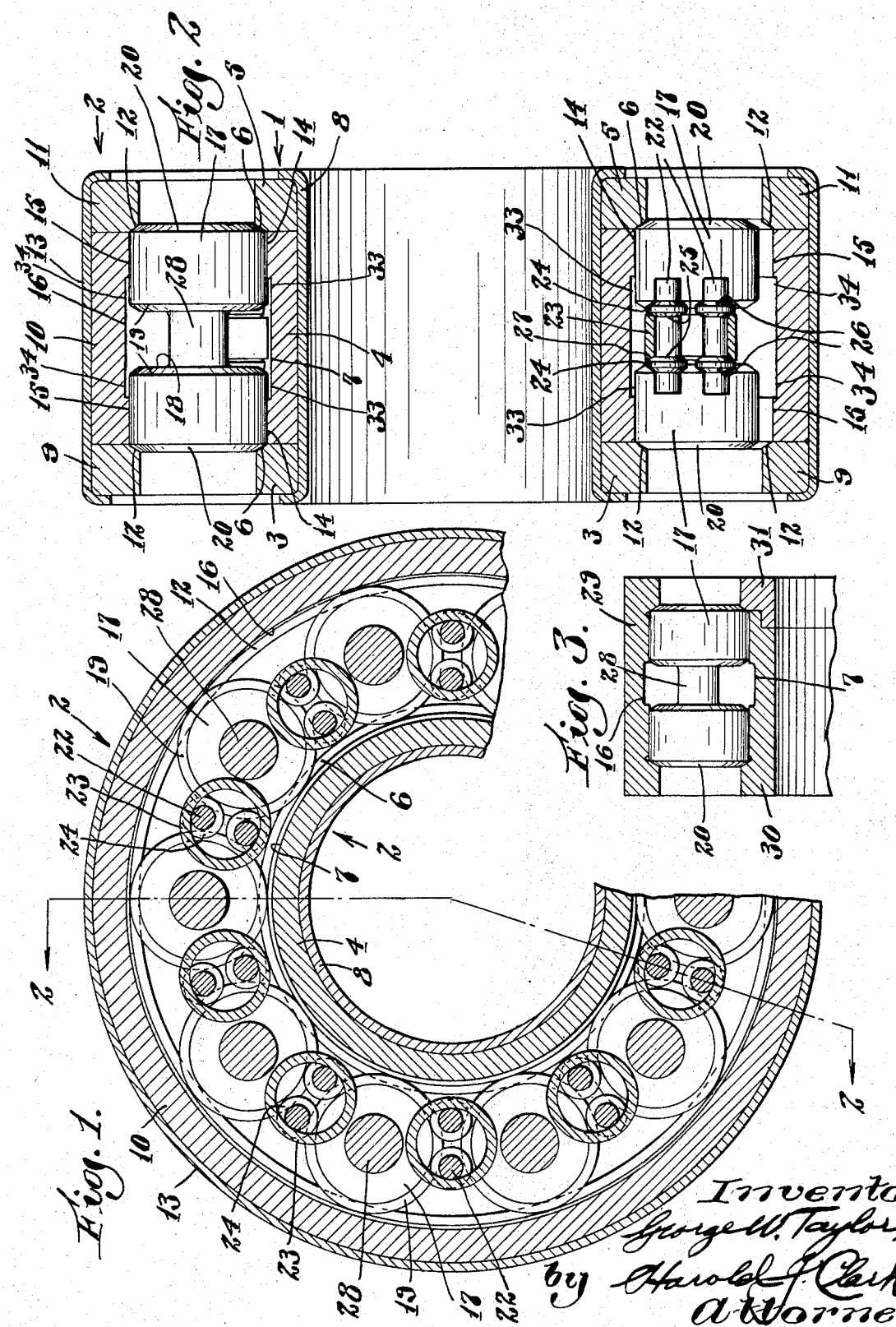
Inventor
George W. Taylor,
by Harold J. Clark.
Attorney Patented Jan. 6, 1931

1,787,603

UNITED STATES PATENT OFFICE

GEORGE W. TAYLOR, OF BOSTON, MASSACHUSETTS, ASSIGNOR TO HAROLD J. CLARK, OF WALTHAM, MASSACHUSETTS

ROLLER BEARING

Application filed February 16, 1928. Serial No. 254,733.

The present invention relates to anti-friction bearings, and more particularly to that type of bearing in which rollers are utilized as the anti-friction means.

The bearing illustrated in the present application is a modification or variation of the bearing illustrated and described in my prior and copending application Ser. No. 155,390, filed December 17, 1926.

An important object of the present invention is to provide a roller bearing which will be simple and economical to manufacture, and which will reduce friction to a minimum.

A further object is the provision of a bearing which will be extremely strong and rugged in its construction, and which, because of the reduction of friction within the bearing, will require substantially no attention, adjustment or alteration after having been once assembled and installed.

My novel bearing is so constructed and arranged as to require no adjustment for wear, the wear on the component parts being exceedingly slight, thus resulting in an exceedingly long lived bearing.

In carrying out the present invention, I utilize two concentric sleeves, having parallel opposed bearing faces, and rolling on these opposed faces are a series or plurality of main supporting rollers, an annular groove being formed centrally of each said roller. Thus, each supporting roller has four edges, and I bevel each of these edges to a predetermined degree, and preferably all of the same angle, for ease in forming, grinding, etc. Between each pair of supporting rollers is mounted or positioned a pair of separating rollers, each pair of which are enclosed in a retaining ring, said rings projecting into the annular grooves in each of the supporting rollers adjacent thereto. On each of the separating rollers are provided a pair of annular ribs beveled upon their opposite sides, thus forming inner and outer beveled shoulders. A pair of shoulders or flanges is provided on the inner, as well as the outer sleeve. These flanges are beveled, and are adapted to cooperate with the outer beveled edges of the supporting rollers, said flanges being beveled on the same angle or inclination as the said outer edges of the supporting rollers. These two pairs of beveled flanges serve as means to guide the supporting rollers in their travel around the race, and also serve as means to retain said rollers constantly in alinement and to prevent longitudinal displacement thereof. Also, said beveled flanges will act as means to take up any end thrust transmitted to the bearing. When radial thrust only is transmitted to the bearing, these flanges will function only as guiding and alining means.

The beveled outer edges of the main supporting rollers, and the beveled flanges cooperating therewith, are designed and constructed so as not to cause any wedging action under end thrust, or radial thrust, and since the principal action of the rollers is on the parallel opposed bearing faces of the race, substantially a pure rolling action is obtained, there being no reverse friction, and little or no sliding friction in the bearing.

I have discovered that, in roller bearings of this type, where separating rollers are utilized, and where the supporting rollers roll on the parallel opposed faces of the concentric sleeves, the wear on the main supporting rollers is greatly increased at certain portions, due to the double wearing effect of both the race and the separating rollers. Due to this increased wear at these portions, sufficient space would be created, to permit the separating rollers to drop or slip from their position between the supporting rollers much sooner than if this double wear did not occur.

In the present bearing I have eliminated this difficulty, and have equalized the wear on the bearing faces of the supporting rollers by undercutting the parallel opposed bearing faces of the concentric sleeves and leaving those portions of the main supporting rollers which are engaged by the projecting ends of the separating rollers free of contact with the races.

This is an extremely important feature, and I believe that the same is broadly novel with me.

It will thus be appreciated that friction in my novel bearing is reduced to the lowest possible minimum.

I believe that my anti-friction bearing, as above briefly described, is novel, and I have therefore claimed the same herein.

The above and other features of the invention, details of construction, and advantages, will be hereinafter more fully pointed out and claimed.

Referring to the drawings, illustrating preferred embodiments of the present invention, Fig. 1 is a cross-sectional view, partly broken away, of my novel bearing;

Fig. 2 is a cross-sectional view on the line 2—2 of Fig. 1; and

Fig. 3 is a cross-sectional fragmentary detail of a modified form of race.

As shown in the drawings, my novel bearing comprises two concentric sleeves designated generally at 1 and 2, 1 being the inner sleeve and 2 the outer sleeve. The inner sleeve 1 may be positioned on an axle, shaft or other support, or may be constructed and arranged to itself constitute the support, as illustrated herein.

An inner sleeve 1 comprises a plurality of members or rings 3, 4 and 5, united and secured in position in the completed bearing by an enclosing sleeve 8. The parallel opposed bearing faces 14, 14, and 15, 15, must be ground to a high finish, to permit free movement of the supporting rollers thereover. To facilitate this grinding action, and to reduce the time element involved, I slightly groove the rings 4 and 10, as illustrated at 7 and 16, which grooves may be only a rough finish, since no wear or contact is made on said grooves.

In the inner sleeve 1, the rings 3 and 5 project beyond the surface of the ring 4, in the manner of flanges, and have their inner edges beveled, as illustrated at 6.

The outer sleeve 2 comprises rings 9, 10 and 11, the rings 9 and 11 projecting beyond the surface of the ring 10, and having their inner edges beveled, as illustrated at 12. These three rings, 9, 10 and 11 are held in united position, in the completed bearing, by an enclosing sleeve 13.

A series of main supporting rollers 17 are provided, each roller being formed with a central annular groove 18 and each said main supporting roller having inner beveled edges 19, and outer beveled edges 20. The outer beveled edges 20 are preferably at the same angle of inclination as the beveled edges 6 and 12 in the inner and outer sleeves, and said beveled edges 6 and 12 cooperate with the beveled edges 20 of the rollers, as clearly illustrated in Fig. 2, to retain said rollers in constant alinement, as well as to eliminate longitudinal displacement thereof.

The projecting portions of the rings 3, 5, 9 and 11 also serve as means to take up end thrust transmitted to the bearing, these projecting portions and the supporting rollers being the only end thrust absorbing means provided in this bearing.

Between each pair of supporting rollers is positioned or placed a pair of separating rollers 22 contained within an enclosing ring 23, and held in appropriate spaced relation by said ring, which ring projects into the annular groove 18 in the rollers 17. A pair of annular ribs 24 is provided on each separating roller 22, said rings being beveled upon their opposite sides, forming inner beveled edges 25 and outer beveled edges 26. The inner beveled edges 25 bear against corresponding bevels 27 formed upon the inner edges of the rings 23, and thus keep the rings 27 out of contact with the supporting rollers 17. It will thus be seen that the beveled shoulders or ribs 24 prevent the separating rollers 22 from moving longitudinally of the bearing relatively to the supporting rollers, as the outer beveled edges 26 bear against the inner beveled edges 19 of said supporting rollers.

By forming the supporting rollers 17 as above described, a relatively thick and heavy connecting bar 28 is formed, of sufficient size and strength to take care of any strains or shocks imparted to the bearing.

It will be appreciated that I may, if desired, form the outer sleeve as a single unit, as illustrated at 29 in Fig. 3, and may form the inner sleeve of two parts, 30 and 31, as also illustrated in Fig. 3.

The preferred method of assembling my novel bearing is to assemble the supporting and separating rollers on the outer sleeve, being held therein by their peculiar construction and because of the snug fitting of all the parts. The supporting and separating rollers are assembled complete on the outer sleeve, with the exception of one set of separating rollers. All the rollers, as thus far assembled, are then spread, and the last pair of separating rollers, in their ring, are sprung into the place provided therefor. This last unit results in a self-locking of all the supporting and separating rollers on the outer sleeves, and affords a self-contained annular unit.

From an inspection of the drawings, and particularly Fig. 2, it will be apparent that I have devised an extremely efficient roller bearing, one capable of withstanding severe shocks and great strains, and one in which friction is reduced to a minimum, thereby increasing the efficiency as well as the life of the bearing.

Radial thrust will be taken up over the broad bearing faces of the rollers 17 and the broad parallel opposed bearing faces of the inner and outer sleeves.

By constructing my novel bearing with all rolling contacts, damage caused by heat is also reduced, and in fact is substantially eliminated, as my novel bearing constructed and arranged as above described, runs cool under all conditions. This, in practice, is an important feature.

In order to equalize the wear on the main supporting rollers, and prevent excessive wear over those portions of the faces of the supporting rollers which are engaged by the projecting ends of the separating rollers, I extend the groove 7, on the inner race, under the bearing faces of the supporting rollers, as shown at 33, for a distance substantially equal to the length of the projecting ends of the separating rollers. The groove 16, in the outer race, is similarly extended under the bearing faces of the supporting rollers, as shown at 34. Thus, those portions of the bearing faces of the supporting rollers which are engaged by the separating rollers, are free of contact with the opposed faces of the races, thus still further reducing wear in the bearing, and increasing the life and utility of the same. The extent to which the grooves 7 and 16 are carried under the supporting rollers will preferably depend on the length of the projecting ends of the separating rollers. These projecting ends of the separating rollers need only be of a sufficient length to perform their separating function, and thus the main portions of the bearing faces of the supporting rollers will contact with the opposed faces of the races to carry out their function of sustaining radial thrust over a wide bearing surface and in a rolling contact.

My present bearing, as herein illustrated and described, presents a simple structure, easy to assemble, inexpensive to manufacture, and of great utility and efficiency in the anti-friction bearing field.

While I have necessarily described my present invention somewhat in detail, it will be appreciated that I am not limited thereto, but may vary the size, shape and arrangement of parts within reasonably wide limits without departing from the spirit of the invention.

My invention is further described and defined in the form of claims as follows:

1. In a roller bearing, inner and outer concentric sleeves, parallel opposed faces of said sleeves forming a race, a series of supporting rollers rolling on said opposed faces, each of said rollers having an annular groove therein, a pair of separating rollers between each pair of supporting rollers and in contact therewith, projecting ends on said separating rollers engaging only a minor portion of the length of the bearing surfaces of said supporting rollers, a retaining ring extending around each of said pairs of separating rollers and projecting into said annular groove in each of said adjacent supporting rollers, beveled outer edges on each supporting roller, parallel flanges on said inner and outer sleeves projecting beyond each opposed bearing face, and beveled edges on said flanges cooperating with the beveled outer edges of said rollers to retain said rollers in constant alinement and prevent longitudinal displacement thereof.

2. In a roller bearing, inner and outer concentric sleeves, parallel opposed faces of said sleeves forming a race, a series of supporting rollers rolling on said opposed faces, each of said rollers having an annular groove therein, a pair of separating rollers between each pair of supporting rollers and in contact therewith, the major portion of each separating roller extending across said grooves, projecting ends of said separating rollers rolling on the bearing faces of said supporting rollers, said race being constructed and arranged to engage the bearing faces of said supporting rollers only on those portions of said bearing faces which are not in engagement with the projecting ends of said separating rollers.

3. In a roller bearing, inner and outer concentric sleeves, parallel opposed faces of said sleeves forming a race, a series of supporting rollers each comprising a pair of cylindrical members, portions only of said cylindrical members rolling on said opposed faces, a pair of separating rollers between each pair of supporting rollers and in contact therewith, projecting ends of said separating rollers engaging the bearing faces of said cylindrical members on those portions of said bearing faces which are not in contact with said parallel opposed faces.

4. In a roller bearing, inner and outer concentric sleeves, parallel opposed faces of said sleeves forming a race, a series of supporting rollers rolling on said opposed faces, a pair of separating rollers between each pair of supporting rollers and in contact therewith, the ends of said separating rollers projecting over the bearing faces of said supporting rollers a predetermined distance, said parallel opposed faces being provided with grooves extending under the bearing faces of said supporting rollers a distance substantially equal to the length of said projecting ends of said separating rollers.

5. In a roller bearing, inner and outer concentric sleeves, parallel opposed faces of said sleeves forming a race, a series of supporting rollers rolling on said opposed faces, each of said rollers having an annular groove therein, a pair of separating rollers between each pair of supporting rollers and in contact therewith, projecting ends on said separating rollers engaging the bearing surfaces of said supporting rollers, a retaining ring extending around each of said pairs of separating rollers and projecting into said annular groove in each of said adjacent supporting rollers, beveled outer edges on each supporting roller, parallel flanges on said inner and outer sleeves projecting beyond each opposed bearing face, and beveled edges on said flanges cooperating with the beveled outer edges of said rollers to retain said rollers in constant alinement and prevent longitudinal displacement thereof.

In testimony whereof, I have signed my name to this specification.

<div align="center">GEORGE W. TAYLOR.</div>